(12) United States Patent
Kerins et al.

(10) Patent No.: US 8,594,326 B2
(45) Date of Patent: Nov. 26, 2013

(54) METHOD OF GENERATING ARBITRARY NUMBERS GIVEN A SEED

(75) Inventors: Timothy Kerins, Eindhoven (NL); Klaus Kursawe, Eindhoven (NL); Pim Theo Tuyls, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 558 days.

(21) Appl. No.: 12/515,814

(22) PCT Filed: Nov. 26, 2007

(86) PCT No.: PCT/IB2007/054784
§ 371 (c)(1),
(2), (4) Date: May 21, 2009

(87) PCT Pub. No.: WO2008/065596
PCT Pub. Date: Jun. 5, 2008

(65) Prior Publication Data
US 2010/0054466 A1    Mar. 4, 2010

(30) Foreign Application Priority Data

Nov. 28, 2006 (EP) ..................... 06124866

(51) Int. Cl.
*H04L 9/00* (2006.01)
(52) U.S. Cl.
USPC .............................................. 380/46; 380/28
(58) Field of Classification Search
USPC ................................................... 380/46
See application file for complete search history.

(56) References Cited

U.S. PATENT DOCUMENTS 5,909,494 A * 6/1999 Blaze ............................. 380/37

FOREIGN PATENT DOCUMENTS

| WO | 2006021911 A1 | 3/2006 |
|---|---|---|
| WO | WO 2006/040724 * | 4/2006 |
| WO | 2006-067739 A2 | 6/2006 |

OTHER PUBLICATIONS

P. Tuyls et al, "Information-theoretic Security Analysis of Physical Uncloneable Functions" Financial Cryptography FC '05, LNCS 3570, Springer-Verlag pp. 141-155, 2005.
H.M. Heys, "Information Leakage of Feistel Ciphers", IEEE Transactions on Information Theory, vol. 47, No. 1, Jan. 2001.
M. Luby et al, "How to Construct Pseudorandom Permutations from Pseudorandom Functions", SIAM Journal on Computing, vol. 17, No. 2, pp. 373-386, 1998.
Menezes et al, "Handbook of Applied Cryptography", Chapter 5, CRC Press, pp. 170-190, Oct. 1996.
R. Pappu et al, "Physical One-Way Functions", Science vol. 297, p. 2026, 2002.
B. Gassend et al, "Silicon Physical Random Functions", 9th ACM Conf on computer and Communications Security, pp. 148-160, 2002.
P. Tuyls et al, "Secret Key Generation from Classical Physics," book Chapter, Hardware Technology Drivers for Ambient Intelligence, pp. 421-447, Kluwer 2005.

(Continued)

*Primary Examiner* — Cordelia Zecher

(57) ABSTRACT

The invention provides a method of generating arbitrary numbers given a seed, characterized by providing a challenge derived from the seed to a physical token, receiving an initial response from the physical token, combining the initial response with helper data associated with the challenge to produce a stable response, and generating the arbitrary numbers using a pseudo-random number generator using the stable response as a seed for the generator. Preferably one or more of these pseudo-random permutations are used as one or more round function(s) in a Feistel block cipher. The generated arbitrary numbers may also be used to create a cryptographic key.

13 Claims, 2 Drawing Sheets

(56) References Cited

OTHER PUBLICATIONS

B. Skoric et al, "Robust Key Extraction from Physical Uncloneable Functions", Lecture Notes in Computer Science, Springer Verlag, Berlin, Germany, vol. 3531, May 20, 2005, pp. 407-422.

P. Tuyls et al, "Read-Proof Hardware from Protective Coatings" LNCS 4249 CHES 2006, pp. 369-383.

O'Donnel et al, "PUF-Based Random Number Generation", MIT CSAIL CSG Technical Memo 481.

R. Anderson et al, Two Practical and Provably Secure Block Ciphers: BEAR and LION, Proceedings of Third International Workshop on Fast Software Encryption, Lecture Notes in Computer Science 1039, pp. 113-120, 1996.

B. Gassend et al, "Controlled Physical Random Functions", Computer Security Applications Conference, Proceedings 18th Annual Dec. 9-13, 2002, Piscataway, NJ, pp. 149-160.

\* cited by examiner

METHOD OF GENERATING ARBITRARY NUMBERS GIVEN A SEED

BACKGROUND OF THE INVENTION

In many cryptographic systems, it is necessary to use arbitrarily chosen numbers. One situation is the generation of cryptographic keys. Sources of truly random numbers are preferred, but such sources typically only provide a limited number of random bits at a time, or are very expensive or cumbersome to use. An inexpensive and easy to use alternative is to use a pseudo-random number generator, which provides a sequence of arbitrary numbers given one input called the seed. The numbers in the sequence appear to be random to standard statistical tests. Using the same seed results in the same sequence being produced again.

The harder it is to predict the next or previous number in the sequence, the more secure the pseudo-random number generator is considered to be. The strongest kind of pseudo-random number generators are called cryptographically secure pseudo-random number generators. These use entropy from a high-quality source such as a hardware-based random-number generator to produce very hard to predict sequences. However, these types of generator have a specific disadvantage: their output is not reproducible as there is no way to input a fixed seed.

A pseudo-random number generator may be used to avoid having to store or transmit a cryptographic key, which typically is much longer than the seed used for pseudo-random number generators. If the same pseudo-random number generator is used with the same seed, the same sequence of arbitrary numbers is obtained.

An inherent disadvantage of this approach is that if the seed used to generate a key is exposed, the key and hence all messages encrypted using that key can be recovered. Thus, keeping the seed a secret is an important requirement. (Of course, once the key has been generated the seed may be erased, but that only shifts the problem to keeping the key a secret.)

Therefore there is a need for a method of generating arbitrary numbers using a pseudo-random number generator in which the seed does not have to be kept a secret yet the output of the pseudo-random number generator cannot be reproduced given the seed and the pseudo-random number generator itself.

SUMMARY OF THE INVENTION

The invention therefore advantageously provides a method of generating arbitrary numbers given a seed, characterized by
providing a challenge derived from the seed to a physical token,
receiving an initial response from the physical token,
combining the initial response with helper data associated with the challenge to produce a stable response, and
generating the arbitrary numbers using a pseudo-random number generator using the stable response as a seed for the generator.

The term 'physical token' here means a token or object that realizes a Physical Random or Unclonable Functions (PUFs). Such a function is easy to evaluate but is difficult to characterize, model or reproduce. A physical token is often a complex physical system comprising many randomly distributed components. When probed with suitable challenges, the complex physics governing the interaction between the physical token and the challenge, e.g. multiple scattering waves in a disordered medium, leads to a random-looking output, or response, for each separate challenge. The complex small-scale structure of the physical token makes it hard to produce a physical copy.

The responses received from the token are susceptible to noise and perturbations, causing differences in responses for identical challenges. Such acquisition noise can have many causes, e.g. token/detector misalignment, or environmental effects such as temperature, moisture and vibrations. For the purpose of the present invention, this is not always a problem: the more unpredictability, the better the quality of the generated arbitrary numbers.

For the present invention it is important that the same challenge presented to the same token produces the same stable response. This requires compensation for acquisition noise. One way of providing this compensation is to generate respective helper data items for respective challenge/response pairs for the physical token. Given a particular challenge a helper data can be constructed that in combination with the measured response provides redundancy. This redundancy is combined in this embodiment with the response received for a particular challenge, ensuring that the same response is obtained for the same challenge.

Because of the use of the helper data, the same challenge will provide the same response. By providing a challenge derived from the seed to the token, it is achieved that the use of the same seed will result in the same response from the token. Subsequently this response is used to initialize the pseudo-random number generator.

The seed does not have to be kept a secret in the invention. The unique properties of the token provide that without the token it is not possible to predict or compute the response to a particular challenge. This means the output of the pseudo-random number generator cannot be reproduced given the seed and the pseudo-random number generator itself, because an essential component, the physical token, is necessary to turn the seed into a response that initializes the pseudo-random number generator.

By itself token-based random number generation is known, e.g. from MIT CSAIL CSG Technical Memo 481, available on the Internet at http://www.csg.csail.mit.edu/pubs/memos/Memo-481/Memo-481.pdf This paper describes the implementation of a hardware random number generator whose underlying physical system is based upon Physical Random Functions.

However this is not the same as the present invention. Merely using a token to generate random number sequences lacks the key factor that the same challenge will provide the same response, allowing the use of the generated arbitrary numbers in situations where reconstruction of a particular sequence is needed. In fact this paper teaches away from the present invention in that it present PRNGs as suffering from major security disadvantages to be overcome by using hardware random number generators instead.

Co-pending patent application WO 2006/067739 provides a method of deriving a key for encrypting or authenticating data sent between first and second nodes, the method comprising determining a representative value from a measurement of a physical uncloneable function; generating a random number; and combining the representative value and the random number to provide an encryption key. This document does not disclose the use of a pseudo-random number generator, let alone generating the arbitrary numbers using a stable response from a PUF as a seed for the generator.

In one embodiment the method further comprises constructing a pseudo-random permutation from the generated arbitrary numbers. Such permutation may advantageously be employed as a round function in a Feistel block cipher, although other applications of such a permutation are also possible. Several Feistel block ciphers use a plurality of respective round functions, which means a corresponding number of pseudo-random permutations are to be constructed. The DES block cipher uses sixteen rounds, for example.

As another example see the LIONESS block cipher described in R. Anderson's and E. Biham's "Two Practical and Provably Secure Block Ciphers: BEAR and LION", Proceedings of Third International Workshop on Fast Software Encryption, Lecture Notes in Computer Science 1039 p113-120 (1996).

By itself it is known from M. Luby and C. Rackoff, "How to construct pseudorandom permutations from pseudorandom functions", SIAM Journal on Computing vol. 17, no. 2, pp. 373-386 (1998) to transform arbitrary numbers into a pseudo-random permutation. This paper also discloses how such a permutation may be employed as a round function in a Feistel block cipher. However Luby and Rackoff nowhere disclose or suggest that the method of claim 1 may be used to create the input to the construction of the pseudo-random permutation.

In another embodiment the method further comprises receiving an input of n+m bits, using n bits from the input as the challenge and combining the remaining m bits from the input with the response received from the physical token. The combining operation is preferably done with an exclusive-OR (XOR) operation. This is the most general form of a Feistel permutation.

In another embodiment the method further comprises employing the generated arbitrary numbers to create a cryptographic key. This embodiment has the advantage that the cryptographic key now can only be reconstructed given the seed and the physical token that was challenged to produce the response that resulted in the generated arbitrary numbers. This provides a significant benefit over traditional solutions where the key resulting from the application of a pseudo-random number generator (or the seed used to initialize it) had to be kept secret. Because the token is a physical object, it is much easier to protect against unauthorized access than a digital data item like a key.

Hence another aspect of the invention is the use of a physical token for the purpose of generating arbitrary numbers, as well as the use of a physical token for the purpose of creating a cryptographic key.

The invention further provides a method of generating a Feistel block cipher, comprising
providing a challenge to a physical token,
receiving an initial response from the physical token,
combining the initial response with helper data associated with the challenge to produce a stable response, and
constructing a pseudo-random permutation from the stable response, and
employing the pseudo-random permutation as a round function in the Feistel block cipher.

This obviates the need for the PRNG, although it does require that the response itself contains enough bits to construct the permutation.

BRIEF DESCRIPTION OF THE FIGURES

These and other aspects of the invention will be apparent from and elucidated with reference to the illustrative embodiments shown in the drawings, in which.

Throughout the figures, same reference numerals indicate similar or corresponding features. Some of the features indicated in the drawings are typically implemented in software, and as such represent software entities, such as software modules or objects.

DETAILED DESCRIPTION OF PREFERRED EMBODIMENTS

Figure 1:
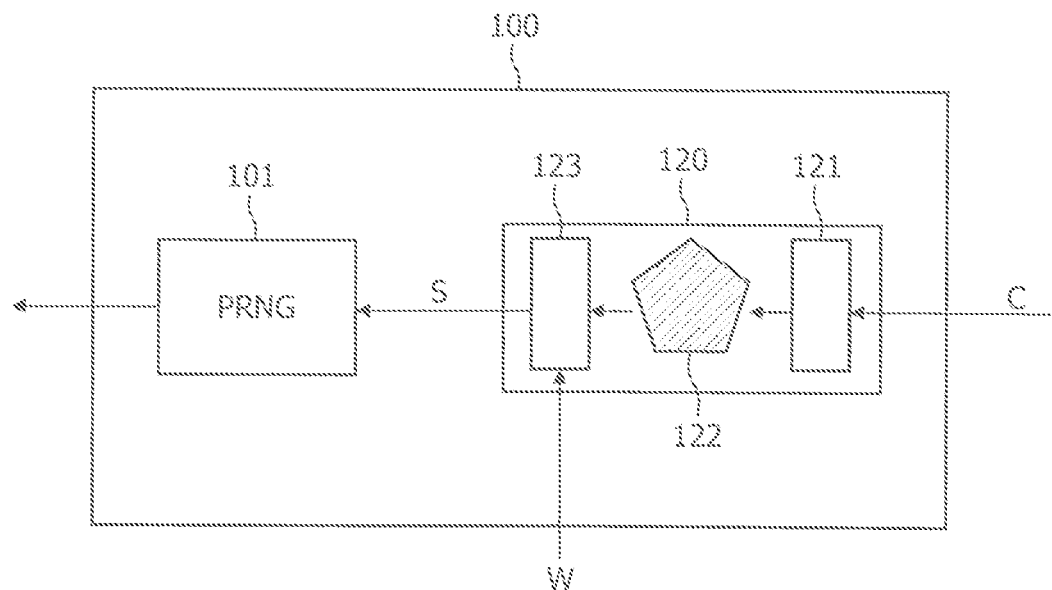
FIG. 1 schematically illustrates a system for generating arbitrary numbers given a seed.

FIG. 1 schematically illustrates a system 100 for generating arbitrary numbers given a seed. The system 100 comprises a pseudo-random number generator or PRNG 101 which produces the arbitrary numbers as output. PRNGs by themselves are well-known. Common types of PRNGs are linear congruential generators, lagged Fibonacci generators, linear feedback shift registers and generalized feedback shift registers. Recent instances of pseudo-random algorithms include Blum Blum Shub, Fortuna, and the Mersenne twister. An extensive treatment of PRNGs may be found e.g. in chapter 5 of the *Handbook of Applied Cryptography* by Menezes, Van Oorschot and Vanstone, CRC Press October 1996, ISBN 0-8493-8523-7.

A PRNG generally speaking produces a sequence of arbitrary numbers that satisfies a number of statistical tests. The sequence thus resembles a real random sequence, but as it is generated by a deterministic process it is not in fact random. To create a particular sequence, the PRNG must be initialized with a certain 'seed' shown as input S in FIG. 1. If the same seed is input to the PRNG, the same sequence of arbitrary numbers will be output.

The produced sequence can be used for any cryptographic or other application where pseudo-random sequences are useful. One application is to employ the generated arbitrary numbers to create a cryptographic key. A key for algorithms such as DES or AES requires a certain number of arbitrarily chosen bits, for example 56 for DES and 128, 192 or 256 for AES. Using a PRNG to generate these bits is a common choice, especially for temporary keys such as session keys used in many secure communication channels.

Another advantageous application is to use the sequence to construct a pseudo-random permutation or PRP, which can then be used as part of a block cipher, for example as a round function in a Feistel block cipher.

A block cipher is a permutation $F:\{0,1\}^{n+m} \to \{0,1\}^{n+m}$ which is parameterized by a key K in $\{0,1\}^k$. The size of the keyspace (in bits) is used as a gauge of the security of the cipher $F_K$. The forward permutation $F_K$ is referred to as encryption and the inverse permutation $F_K^{-1}$ is referred to as decryption. From a mathematical perspective a block cipher $F_K$ is secure if no black-box attack (i.e. accessing only inputs and outputs to the cipher, x in $\{0,1\}^{m+n}$ and output $F_K(x)$ in $\{0,1\}^{m-n}$) can determine the cipher key K in $\{0,1\}^k$ with an advantage over bruteforce (i.e. trying all of the $2^k$ possible keys). A paradigm in block cipher design is Kerckhoffs' Principle which states that all security should reside in the key K and not in the general structure of the algorithm in question. This means that preferably the precise permutation $F_K$ should be treated as a secret, but the general structure may be made public information. Commonly used block ciphers include the DES and AES block ciphers.

Luby and Rackoff describe in their paper referenced above a simple construction for a pseudorandom permutation generator $P_i:\{0,1\}^{n+m} \to \{0,1\}^{n+m}$ from any pseudorandom function generator $\{f_i\}$. This allows for a secure block ciphers based on certain "good" properties of the components internal $f_i$ to the cipher. The main feature of this construction is as follows: functions $\{f_i\}$, $f_i:\{0,1\}^n \to \{0,1\}^m$ are a pseudorandom function family (PRF) if for a randomly chosen function $f$ and string x in $\{0,1\}^n$ an attacker is unable to distinguish $f_i(x)$ in $\{0,1\}^m$ from a random string in $\{0,1\}^m$. Let $x_l$, $x_r$ in $\{0,1\}^n$ and $x_l\&x_r$ in $\{0,1\}^{n+m}$ denote the concatenation of $x_l$ and $x_r$, and + denotes the exclusive or (xor) of two elements of $\{0,1\}^n$. Permutation $P_i$, the Feistel Permutation is defined as $$P_i(x_l\&x_r)=x_r\&[f_i(x_r)+x_l] \quad (1)$$

The Luby-Rackoff cipher consists of a number of iterations of Feistel permutations. In the embodiment described below a 4 round Feistel Network is used as defined by $$F_K(x_l\&x_r)=P_4(P_3(P_2(P_1(x_l\&x_r)))) \quad (2)$$

In equation (2) the key secret K consists of the four pseudorandom random functions $f_1$, $f_2$, $f_3$ and $f_4$ and the keyspace $2^k$ consists of the number of possible choices for these functions. In this case $F_K(x_l\&x_r)$ is indistinguishable from a random element of $\{0,1\}^{n+m}$ by any adversary assuming the same indistinguishability property of $f_1$, $f_2$, $f_3$, $f_4$.

As stated a given seed S used as input can be used to reproduce a corresponding sequence of arbitrary numbers. This means that if an attacker knows the PRNG and the seed S, he can recover e.g. the key generated from that sequence. To prevent this, the present invention proposes the use of a physical token 120 to provide a stabilized response to a challenge from the physical token as a seed for the PRNG. Such a token 120 that provides a stabilized response to a challenge is sometimes referred to as a Controlled PUF or CPUF.

Physical Random (Uncloneable) Functions (PUFs) are physical systems that are easy to evaluate but difficult to characterize, model or reproduce. PUFs are systems manufactured with some physical random process such that they interact in a complicated way with their inputs to produce deterministic but seemingly random outputs. Examples of PUFs are disclosed in 1. R. Pappu, B. Recht, J. Taylor, N. Gershenfeld, "Physical One-Way Functions", Science vol 297, pp. 2026, (2002)
2. P. Tuyls, B. Skoric, S. Stallinga, A. H. Akkermans, W. Ophey, "Information-Theoretic Security Analysis of Physical Unclonable Functions", Financial Cryptography FC'05, LNCS 3570, Springer-Verlag pp. 141 (2005)
3. B. Skoric, P. Tuyls W. Ophey, "Robust key extraction from Physical Unclonable Functions", Applied Cryptography and Network Security ACNS 2005, LNCS 3531, pp. 407-422 (2005)
4. P. Tuyls, B. Skoric, G. J. Schrijen, R. Wolters, J. van Geloven, N. Verhaegh, H. Kretschmann, "Read-proof hardware from protective coatings", CHES 2006 to appear (2006)
5. B. Gassend, D. Clarke, M. van Dijk, S. Devadas, "Silicon Physical Random Functions", 9th ACM Conf on Computer and Communications Security (2002)
6. P. Tuyls, B. Skoric, "Secret Key Generation from Classical Physics", Book Chapter, Hardware Technology Drivers for Ambient Intelligence, Kluwer (2005)

Several physical systems are currently known on which PUFs can be based. The main types are optical PUFs (see reference 1), coating PUFs (reference 4), silicon PUFs (reference 5) and acoustic PUFs (reference 6). In fact any physical system with the following properties can be used as a PUF if it has the following properties:

Cheap and easy to manufacture and involves randomized manufacturing process

Impractical to characterize and model

Large input/output space

A PUF p generates a response r from a challenge c, i.e. r=p(c) in such a way, that due to the randomness of the PUF and the physical complexity of the interactions within the PUF r cannot be recovered from c as The PUF itself is hard to characterize i.e. even with the best measuring equipment all of the details about the internal structure of the PUF can not be obtained with sufficient accuracy or the cost of doing so is prohibitively expensive.

Even if these details can somehow be obtained then constructing a mathematical model is of the input-behavior of the PUF is computationally very difficult, if not completely impractical.

Although this invention is applicable to all types of PUF, as an example consider the specific example of the optical PUF as a concrete example of the concepts described here. Optical PUFs consist of a transport material consisting of randomly distributed scattering particles. The randomness here is provided by the uniqueness and unpredictability of speckle patterns that result from multiple scattering of laser light in a distorted optical media (reference 2). For a fixed wavelength of incident light, the input is the angle of incidence, focal distance, mask pattern or any other reproducible change in the wave front. The output is the resulting speckle pattern. Even given all of the precise details of the scatters it is extremely difficult to recover a particular speckle pattern.

A controlled PUF (CPUF) is a PUF whose output has been stabilized. That is, a given challenge to a CPUF will produce the same response. Due to the uniqueness and unpredictability of ordinary PUFs presenting the same challenge to a PUF may produce (slightly) different results. This generally involves the application of helper data and/or error correction and also potentially some simple post processing of the PUF response data in order to enhance its "randomness" properties from a cryptographic perspective.

In order to generate reproducible PUF responses there are two general methods to ensure the integrity of a response.

In a first method, the PUF initially goes through an enrolment phase where a number of initial responses are produced for corresponding challenges. For each initial response, helper data is generated that will compensate for variations in the response for a given challenge. This helper data then acts as an error correction on the PUF responses to ensure a stable response.

In a second method, if enough data about the physical properties of the PUF is present the PUF is capable of generating its own helper data on the fly. This involves storage and some knowledge of the physics of the PUF.

For more information on PUFs and the construction of helper data to stabilize PUF responses the reader is referred to the literature cited above.

The CPUF 120 is used in the present invention as follows. A certain challenge C is provided to the CPUF 120. A generator 121 transforms the challenge C into the appropriate signal (e.g. a light beam) to entice a response from a physical object 122. This initial response is measured by receiver 123. The receiver 123 also obtains helper data W and combines the initial response from the object 122 to produce a stable response from the initial response. The stable response is then output as the seed S.

Figure 2:
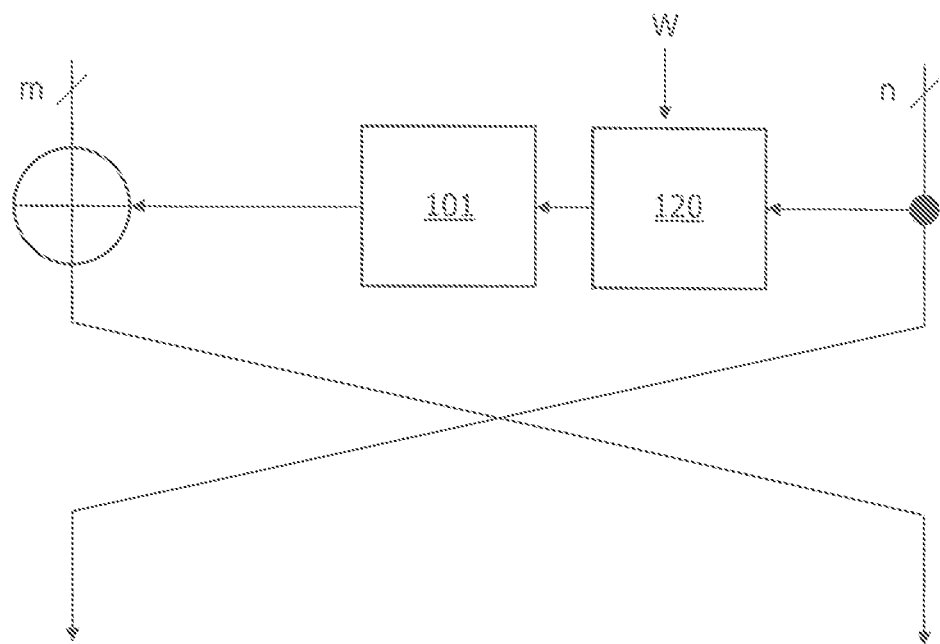
FIG. 2 schematically illustrates an embodiment of a pseudorandom permutation based on a CPUF.

An embodiment of a pseudorandom permutation based on controlled PUFs is illustrated schematically in FIG. 2. The input, assumed to be m+n bits long, is first split in to a left side of m bits and a right side of n bits. The n bits on the right are converted to a challenge for the CPUF 120. The CPUF 120 provides a stable response using separately obtained helper data w. The response is provided as a seed to the PRNG 101 to produce an output, which in this embodiment is also m bits long.

The output is then combined with the original m bits on the left hand side of the input. The combining is preferably done using an XOR operation. The right and left hand sides are then swapped to produce the output of the permutation.

To create a Feistel cipher, a number of these pseudorandom permutations, preferably at least four, are then performed one after the other.

The system 100 could be implemented as a device such as a personal computer, mobile phone or set-top box that needs to generate an arbitrary sequence. In such a device the CPUF 120 or the object 122 is preferably realized as a removable component. This enhances the security of the device: without the object 122 it is impossible to regenerate a particular sequence, even when the challenge C and the helper data W are known.

In an alternative embodiment of the invention, the pseudo-random permutation is constructed directly from the stable response from the CPUF 120. This obviates the need for the PRNG 101, although it does require that the response itself contains enough bits to construct the permutation. The CPUF 120 may be challenged multiple times to provide a sufficient number of bits for constructing the permutation. The pseudo-random permutation can then be employed as one or more round functions in a Feistel block cipher, as explained above.

Figure 3:
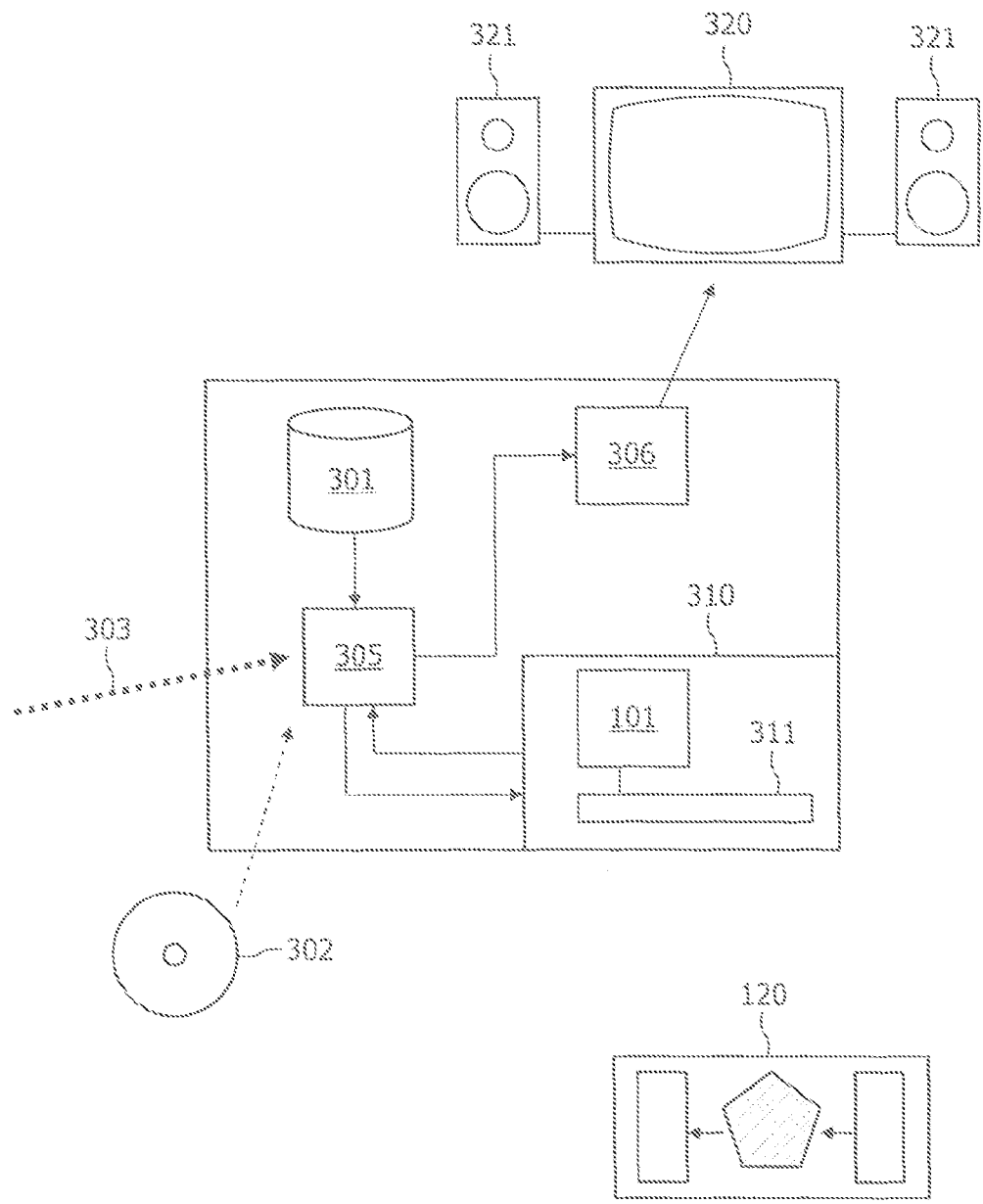
FIG. 3 shows a data processing system configured to provide access to encrypted data, in which a CPUF is used as the basis for a decryption key.

FIG. 3 schematically shows a data processing system 300 such as a personal computer, mobile phone or set-top box configured to provide access to electronic data. The data can be stored on internal storage medium 301, e.g. a hard disk or solid state memory, be provided on external storage medium 302, e.g. a DVD disc, or be received from an external source using receiver 303, for example by way of download from the Internet or over a mobile network.

As the data is encrypted, a decryption module 305 is needed to decrypt the data. The data is then processed by processing module 306. The data can be any type of data, so the type of processing depends on the type of data. For example the data may be audiovisual data, which is then rendered on a display screen 320 and/or through loudspeakers 321.

In contrast to systems where the decryption key must be stored in or transmitted to the system 300, the system 300 comprises key generating module 310 that comprises the system 100. This module 310 produces the key necessary to decrypt the data.

The module 310 is provided with a slot 311 for inserting the CPUF 120. During operation the decryption module 305 signals to the module 310 that a decryption key is required and indicates which challenge and which helper data are to be used. The user then inserts the CPUF 120 into the slot 311. The CPUF 120 is challenged using the provided challenge data, the initial output is stabilized using the provided helper data and the stable output is provided to the PRNG 101 to generate the arbitrary sequence of numbers that is to be returned to the decryption module to serve as the decryption key. Without the CPUF 120, the module 310 is unable to recover the key necessary to decrypt the data.

The challenge data and helper data may also be stored in the system 300, may be provided with the data as it enters the system, or may be downloaded or obtained separately otherwise. The challenge and applicable helper data could be stored associated with the electronic data in a plaintext form. For instance the storage medium 302 may provide in a separate field or location the challenge and helper data. This data could also be provided in a digital license or rights object that also indicates the usage rules associated with the electronic data. Digital licenses and rights objects are used in the field of digital rights management and conditional access.

Thus, advantageously the object 122 is now used as a physical key to decrypt electronic data. Whoever possesses the object 122 and knows the right challenge and helper data can initialize the PRNG 101 with the right seed to generate the sequence of arbitrary numbers that lies at the basis of the cryptographic key. But without the object 122 the right seed and hence the right sequence cannot be obtained. Note that this removes a requirement to store the key or key-related data in electronic form, which reduces the security requirements of devices employing such a key.

It should be noted that the above-mentioned embodiments illustrate rather than limit the invention, and that those skilled in the art will be able to design many alternative embodiments without departing from the scope of the appended claims. For instance, certain classes of CPUFs can be constructed in such a manner that two or more CPUFs produce the same stable response given the same input. When this class of CPUF is used, the two or more CPUFs then all serve as key. The arbitrary sequence of numbers can be used directly as a key, or further processing may be applied to transform the sequence into a key.

In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements, and by means of a suitably programmed computer.

In a device claim enumerating several means, several of these means can be embodied by one and the same item of hardware. The mere fact that certain measures are recited in mutually different dependent claims does not indicate that a combination of these measures cannot be used to advantage.

The invention claimed is:

1. A method of generating arbitrary numbers given a seed, comprising:
   providing a challenge derived from the seed to a physical token, wherein said challenge represents a known number of bits of said seed;
   receiving an initial response from the physical token,
   combining the initial response with helper data associated with the challenge to produce a stable response, and
   generating the arbitrary numbers using a pseudo-random number generator using the stable response as a seed for the generator.

2. The method of claim 1, further comprising constructing a pseudo-random permutation from the generated arbitrary numbers.

3. The method of claim 2, further comprising employing the pseudo-random permutation as a round function in a Feistel block cipher.

4. The method of claim 2, in which a plurality of pseudo-random permutations are constructed and employed as respective plural round functions in the Feistel block cipher.

5. The method of claim 1, comprising employing the generated arbitrary numbers to create a cryptographic key.

6. A method for generating arbitrary numbers comprising:
   generating a pseudo-random number, said pseudo-random number being generated using a response from a physical token that has been stabilized using helper data to a challenge from the physical token as a seed for a generator, wherein said challenge represents a known number of bits of a challenge seed.

7. A method for creating a cryptographic key comprising:
generating arbitrary numbers using a pseudo-random number generator using a response to a challenge from a physical token as a seed for the pseudo-random number generator, wherein said response is stabilized using helper data wherein said challenge represents a known number of bits of a challenge seed; and
creating the cryptographic key from the generated arbitrary numbers.

8. A system for generating arbitrary numbers given a seed, comprising:
means for providing a challenge derived from the seed to a physical token, wherein said challenge represents a known number of bits of said seed;
means for receiving an initial response from the physical token,
means for combining the initial response with helper data associated with the challenge to produce a stable response, and
means for generating the arbitrary numbers using a pseudo-random number generator using the stable response as a seed for the generator.

9. A method of generating a Feistel block cipher, comprising
providing a challenge to a physical token, said challenge being derived from a seed value, wherein said challenge represents a known number of bits of said seed;
receiving an initial response from the physical token,
combining the initial response with helper data associated with the challenge to produce a stable response,
constructing a pseudo-random permutation from the stable response, and
employing the pseudo-random permutation as a round function in the Feistel block cipher.

10. The method of claim 9, in which a number of pseudo-random permutations are constructed and employed as respective round functions in the Feistel block cipher.

11. The method of claim 9, in which the pseudo-random permutation is constructed by generating plural arbitrary numbers using a pseudo-random number generator using the stable response as a seed for the generator and using the arbitrary numbers to construct the permutation.

12. A system for generating a Feistel block cipher, comprising
means for providing a challenge to a physical token, said challenge being derived from a seed value, wherein said challenge represents a known number of bits of said seed;
means for receiving an initial response from the physical token,
means for combining the initial response with helper data associated with the challenge to produce a stable response,
means for constructing a pseudo-random permutation from the stable response, and
means for employing the pseudo-random permutation as a round function in the Feistel block cipher.

13. A system for creating a cryptographic key comprising:
a pseudo-random number generator generating arbitrary numbers using a response to a challenge from a physical token as a seed for the pseudo-random number generator, wherein said response is stabilized using helper data, wherein said challenge represents a known number of bits of a challenge seed; and
means for creating the cryptographic key from the generated arbitrary numbers.

* * * * *